United States Patent [19]
Young

[11] Patent Number: 5,950,948
[45] Date of Patent: Sep. 14, 1999

[54] COIL SPRING ANTI-REVERSE MECHANISM FOR A FISHING REEL

[75] Inventor: John Newton Young, Fairfax, Calif.

[73] Assignee: Charles C. Worth Corporation, San Rafael, Calif.

[21] Appl. No.: 08/991,445

[22] Filed: Dec. 16, 1997

Related U.S. Application Data

[60] Provisional application No. 60/033,013, Dec. 16, 1996.

[51] Int. Cl.$^6$ ..................................................... A01K 89/02
[52] U.S. Cl. .......................... 242/245; 242/247; 242/300; 242/301; 192/223.4
[58] Field of Search ..................................... 242/244, 245, 242/246, 247, 295, 298, 299, 300, 301; 192/223.4

[56] References Cited

U.S. PATENT DOCUMENTS

| | | | |
|---|---|---|---|
| 2,564,603 | 8/1951 | Jaskey | 242/278 X |
| 3,659,682 | 5/1972 | Meyer et al. | 192/223.4 X |
| 3,759,358 | 9/1973 | Quenneville | 192/223.4 |
| 3,837,441 | 9/1974 | Uno et al. | 192/223.4 X |
| 4,533,027 | 8/1985 | Otani et al. | 192/223.4 |
| 4,953,676 | 9/1990 | Yamada et al. | 192/223.4 |
| 5,020,738 | 6/1991 | Yamaguchi | 242/247 X |
| 5,058,720 | 10/1991 | Rude et al. | 192/223.4 X |
| 5,328,007 | 7/1994 | Yokozuka et al. | 192/223.4 |
| 5,419,504 | 5/1995 | Miyazaki et al. | 242/247 |
| 5,464,083 | 11/1995 | Arnold et al. | 192/223.4 |
| 5,503,343 | 4/1996 | Hirano et al. | 242/247 |

*Primary Examiner*—Donald P. Walsh
*Assistant Examiner*—Emmanuel M. Marcelo
*Attorney, Agent, or Firm*—Law Office of Virginia H. Meyer; Virginia H. Meyer, Esq.; Mark J. Spolyar, Esq.

[57] ABSTRACT

An anti-reverse mechanism that is adaptable to have application in a majority of conventional fishing reel designs and configurations. More particularly, a coil-spring, anti-reverse mechanism that acts upon certain standard components of a drive train in a conventional fishing reel, including the main gear, rotor and pinion. In preferred embodiments, the anti-reverse mechanism of the present invention may further include an On/Off selector assembly for selectively engaging the anti-reverse mechanism.

28 Claims, 5 Drawing Sheets

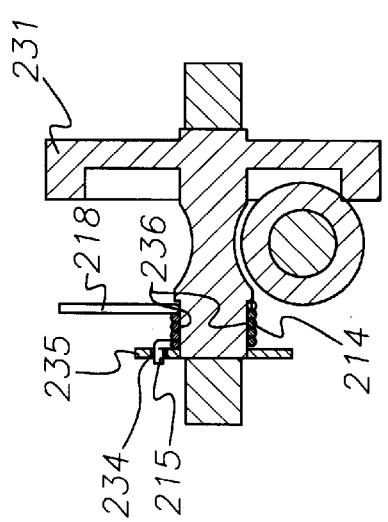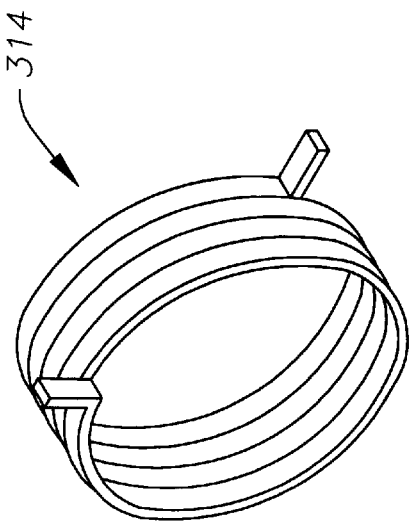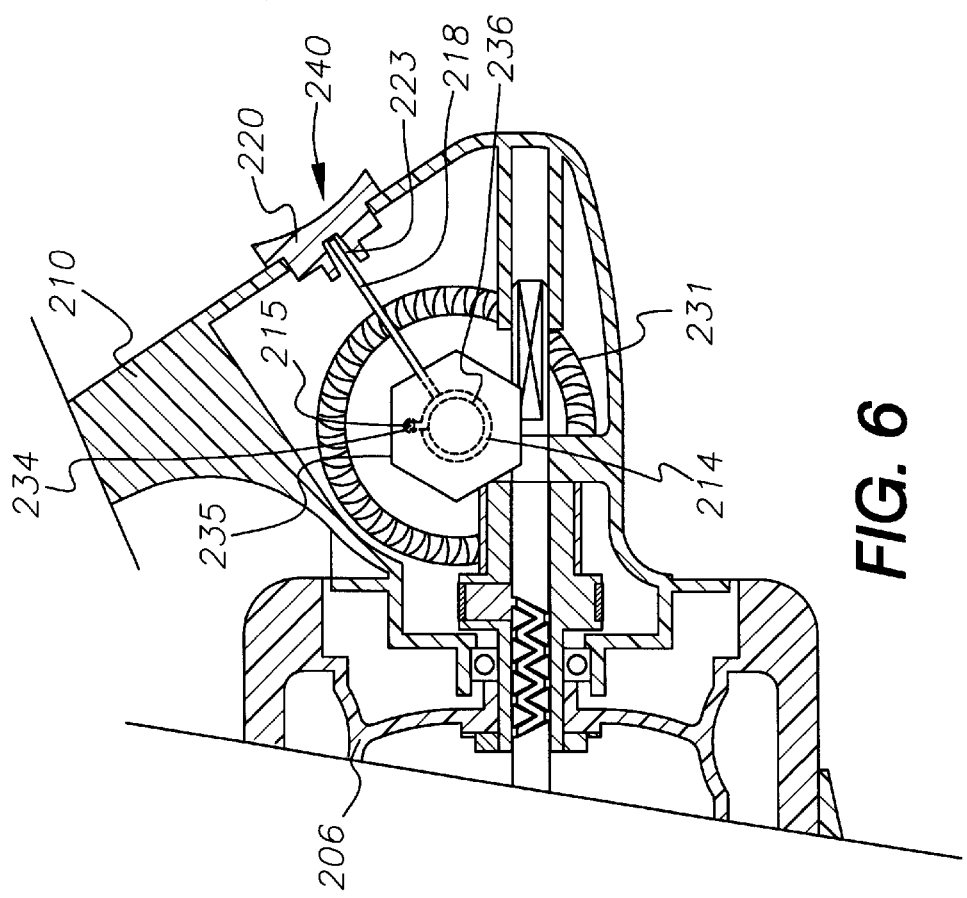

COIL SPRING ANTI-REVERSE MECHANISM FOR A FISHING REEL

RELATED APPLICATION

This application claims the benefit of U.S. Provisional Patent Application No. 60/033,013 filed Dec. 16, 1996.

FIELD OF INVENTION

The present invention relates to a fishing reel that winds line on a spool. More particularly, the present invention relates to a fishing reel with an improved anti-reverse mechanism.

BACKGROUND OF THE INVENTION

The use of anti-reverse mechanisms on fishing reels to selectively permit handle rotation in only one direction is known. Prior art anti-reverse mechanisms incorporate either an anti-reverse pawl engaging a ratchet, or a one-way clutch bearing fit into some area of the drive train.

The major disadvantage of anti-reverse mechanisms using a pawl engagement is the fixed number of stop points determined by the number of engagement teeth in the anti-reverse ratchet. It is more desirable to have an unlimited number of stop points. Anti-reverse mechanisms using one-way clutch bearing means are costly due to the cost of the one-way clutch bearing. Further, such fishing reels have complicated and expensive mounting means in the reel body, especially if the anti-reverse mechanism includes a selective on/off function. Further, the physical size of one-way clutch bearings limits the locations in the drive train where the bearing may be applied.

SUMMARY OF THE INVENTION

The present invention provides an anti-reverse mechanism that is configurable to have application in a majority of fishing reel designs and configurations having standard drive train components. More particularly, the present invention provides a coil-spring, anti-reverse mechanism that acts upon certain components of a standard drive train in a conventional fishing reel. Fishing reels of various designs and configurations all share at least three common drive train elements; i.e., a main gear, a rotor, and a pinion. The present invention in various different embodiments is adaptable to act on each of these elements to effect an anti-reverse mechanism. The present invention is an anti-reverse mechanism comprising a coil spring and an adapted reel body for operably positioning the coil spring in frictional engagement with the desired drive train element. In preferred embodiments, the anti-reverse mechanism of the present invention may further include an on/off selector assembly for selectively engaging the anti-reverse mechanism.

In essential terms, the anti-reverse mechanism of the present invention is an anchored coil spring that is positioned around a standard rotating element of a fishing reel drive train. According to the teaching of the invention, the coil spring is tightened around a selected rotating element such that the anchored coil spring frictionally engages the outer surface of the surrounded drive train component. When the drive train component rotates in a loosening direction of the coil spring, the friction between that rotating component and the coil spring generates a force that loosens the spring's grip on the component, thereby permitting said component to rotate. Conversely, when the same drive train component rotates in the opposite or a tightening direction, the friction between that component and the coil spring generates a force that tightens the spring's grip on the component, and thereby prevents that component and the entire drive train from moving.

In its broadest context, the present invention is a fishing reel having a coil spring anti-reverse mechanism, comprising a reel body having anchoring means, a pinion journalled in said reel body, a rotor fixed to said pinion, and a main gear journalled into said reel body and operably engaging said pinion, a coil spring having a first anchoring end and a second engaging end and tensioning means, wherein the coil spring is fixed at said anchoring end to the anchoring means of the reel body, wherein the coil spring closely circumscribes at least one element of the drive train, and wherein coil spring tensioning means is in frictional contact with the circumscribed drive train element, and further that when the circumscribed drive train element rotates in the loosening direction of the coil spring, the frictional contact between the rotating circumscribed drive train element and the coil spring urges the coils of the spring to loosen permitting said drive train element and related components to rotate freely; and, such that when the circumscribed drive train element rotates in the tightening direction of the coil spring, the frictional contact between the circumscribed drive train element and the anchored coil spring urges the coils of the spring to grasp the circumscribed drive train element and prevent the circumscribed drive train element and the related components of the drive train from rotating.

OBJECTS OF THE INVENTION

It is an object of the invention to provide an anti-reverse mechanism with an unlimited number of stop points.

It is a further object of the invention to provide an anti-reverse mechanism that is of low cost and simple to manufacture and install in reel assemblies.

Further, it is an object of the invention to provide an anti-reverse mechanism that can be applied to act upon a standard component of a fishing reel drive train.

BRIEF DESCRIPTION OF THE DRAWINGS

FIG. 6 is an enlarged sectional view of a FIG. 1 illustrating the application of the anti-reverse mechanism on the main gear.

FIG. 7 is an end view of the main gear and an applied anti-reverse mechanism of the present invention, as shown in FIG. 6.

FIG. 8 is a perspective view of the coil spring of the anti-reverse mechanism showing the use of coiled flat strapping instead of conventional round wire.

DESCRIPTION OF A FIRST PREFERRED EMBODIMENT

Figure 1:
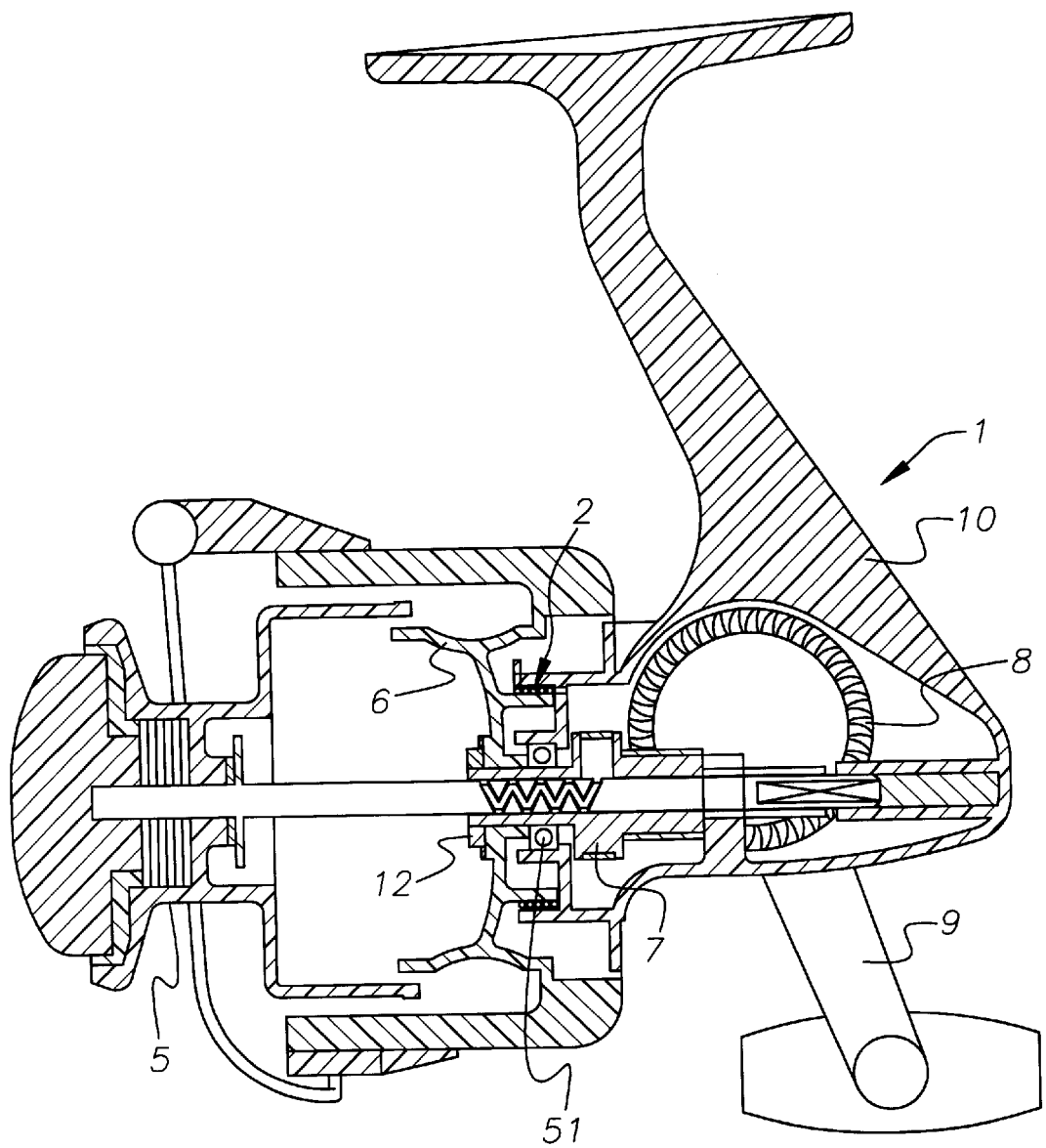
FIG. 1 is a cutaway view of a fishing reel showing the application of the anti-reverse mechanism on the rotor of a fishing reel drive train.

FIG. 1 illustrates the various elements of a fishing reel drive train to which the anti-reverse mechanism of the present invention has application. Specifically, FIG. 1 discloses reel 1 having a standard drive train to wind fishing line onto spool 5. Briefly described, handle 9 is fixed to main gear 8. Main gear 8 is rotatably carried in reel body 10 and engages pinion 7. Pinion 7 is journalled in reel body 10 through bearing 51. Pinion 7 is fixed to rotor 6 by rotor nut 12. When handle 9 is cranked, main gear 8 engages pinion 7 to turn rotor 6, thereby winding fishing line around spool 5. Further, FIG. 1 illustrates the placement of the anti-reverse mechanism of the present invention on rotor 6. Specifically, the anti-reverse mechanism of this invention is positionable on rotor 6 at first section 2. In other preferred embodiments (described below), the coil spring anti-reverse mechanism of the present invention is placed to act on the main gear 8 or on the pinion 7. Furthermore, it is to be understood that the anti-reverse mechanism can be placed in various different locations on each of the above-mentioned main drive components, and that for descriptive purposes only one of the several possible mechanism locations is illustrated.

Figure 3:
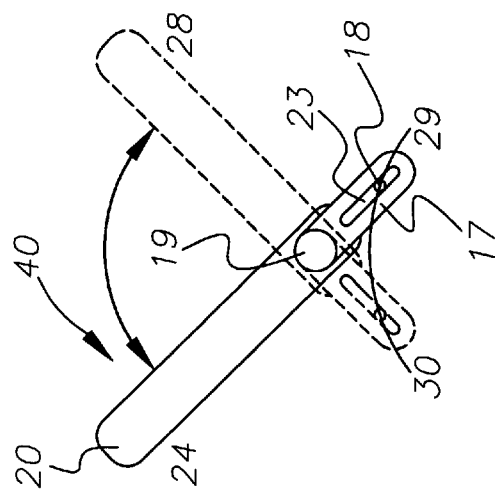
FIG. 3 is a front view of the on/off selector assembly as taken along line 3–3 of FIG. 2.
Figure 2:
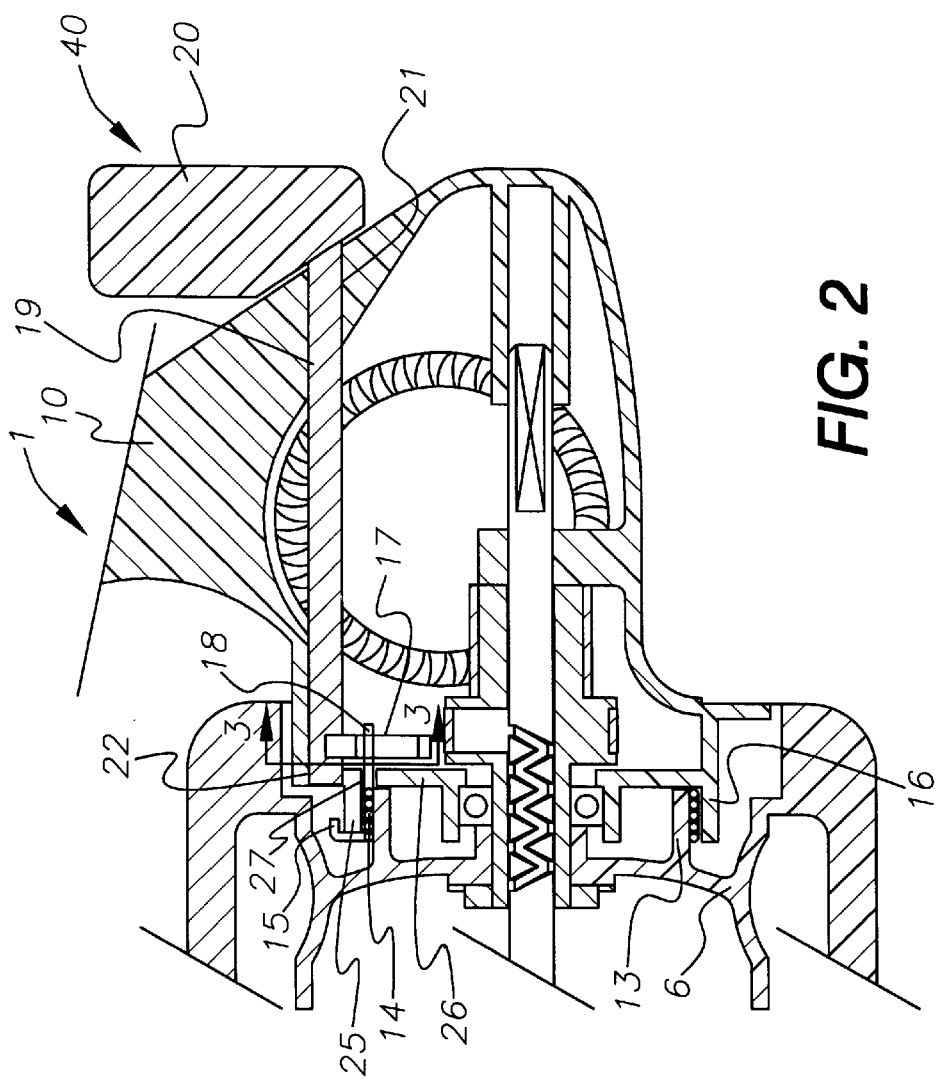
FIG. 2 is an enlarged and modified view of FIG. 1 showing in more detail the application of the anti-reverse mechanism on the rotor of a fishing reel.

Referring to FIGS. 2 and 3, a first preferred embodiment of the present invention is disclosed, wherein the anti-reverse mechanism engages rotor 6 of a reel 1. The anti-reverse mechanism of the present invention comprises a coil spring 14, on/off selector assembly 40, adapted rotor 6 having a first annular member 13, and adapted reel body 10 having a second annular member 16 formed at the forward portion thereof.

Second annular member 16 of reel body 10 is formed to include slot 25. Coil spring 14 is configured to circumscribe first annular member 13 in close proximity to the outside diameter thereof. Coil spring 14 is also configured to fit in close proximity within the inside diameter of second annular member 16. The first end of coil spring 14 is formed to include anchoring arm 15. Anchoring arm 15 positions in slot 25 of second annular member 16 to hold coil spring 14 rotationally fixed relative to second annular member 16 of reel body 10. The second end of coil spring 14 is formed to include coil spring engaging arm 18. (See FIG. 2.)

Reel body 10 is formed to further include forward bulkhead 26 with hole 27 therethrough. Reel body 10 is also formed to pivotally carry on/off selector assembly 40 at first bearing surface 21 and second bearing surface 22. (See FIG. 2.) On/off selector assembly 40 comprises anti-reverse switch 20, support shaft 19, and switch cam 17. (See FIG. 3.) Anti-reverse switch 20 and switch cam 17 are fixed at opposite ends of support shaft 19 as shown in FIGS. 2 and 3. Switch cam 17 is formed to include engaging slot 23. Support shaft 19 is pivotally carried in reel body 10 through first bearing surface 21 and second bearing surface 22. As shown in FIGS. 2 and 3, engaging arm 18 of coil spring 14 passes through hole 27 of bulkhead 26 to engage control slot 23 while anchoring arm 15 is fixed in slot 25.

Pivoting anti-reverse switch 20 between OFF position 24 and ON position 28 moves cam 17 between positions 29 and 30 respectively. Cam 17 includes slot 23 that is engaged by engaging arm 18 so that as cam 17 moves between positions 29 and 30, engaging arm 18 is likewise moved between positions 29 and 30 by the related movement of slot 23.

When engaging arm 18 is in position 29, coil 14 loosely surrounds first annular ring 13 of rotor 6 allowing rotor 6 and other members of the drive train to freely rotate in either direction.

When engaging arm 18 is in position 30, coil spring 14 is urged into tighter frictional contact with first annular ring 13 so that first annular ring 13 may rotate freely in a first direction but is prevented from rotating in a second or reverse direction. When annular ring 13 is urged in said first direction, coil spring 14 is loosened and thereby may rotate in said first direction. When annular ring 13 is urged to rotate in the second direction, coil spring 14 compresses into a tightened grasp around annular ring 13 to prevent annular ring 13 from rotating relative to body 10 through anchoring arm 15.

DESCRIPTION OF A SECOND PREFERRED EMBODIMENT

Figure 5:
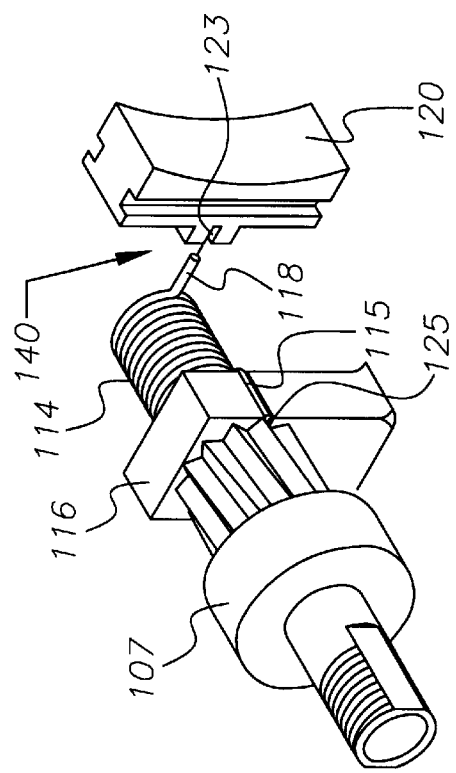
FIG. 5 is an exploded view of the anti-reverse mechanism and its application to the pinion gear of a fishing reel.
Figure 4:
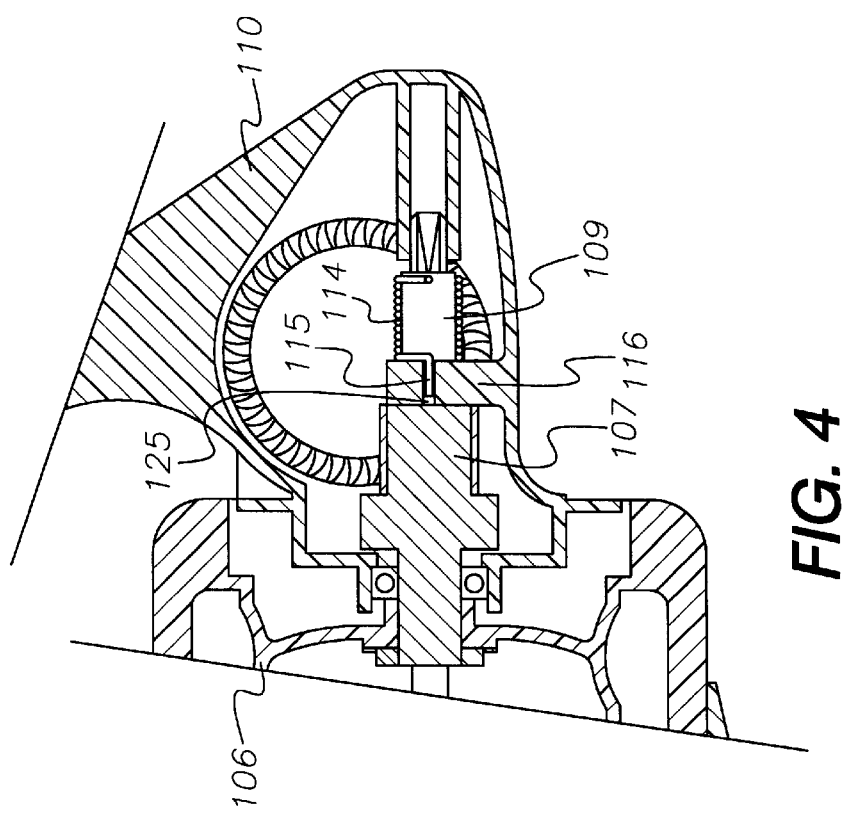
FIG. 4 is an enlarged and partial view of FIG. 1 showing in greater detail the application of the anti-reverse mechanism on the pinion gear of a fishing reel.

FIG. 4 and FIG. 5 illustrate a second preferred embodiment of the present invention. Specifically, FIGS. 4 and 5 disclose the anti-reverse mechanism as applied to the pinion of a fishing reel drive train.

The anti-reverse mechanism of the second preferred embodiment comprises a coil spring 114, on/off selector assembly 140, adapted pinion gear 107 having pinion extension 109, adapted support block 116 having slot 125, and adapted reel body 110 slidably carrying on/off selector assembly 140. (See FIGS. 4 and 5.)

Support block 116 of reel body 110 is formed to include slot 125. Friction coil spring 114 is configured to circumscribe pinion extension 109 of pinion gear 107 in close proximity to the outside diameter thereof. A first end of coil spring 1 14 is formed to include anchoring arm 115. Anchoring arm 115 positions in slot 125 of support block 116 to hold coil spring 1 14 rotationally fixed relative to support block 116 of reel body 110. (See FIG. 4.) A second end of coil spring 114 is formed to include engaging arm 118. (See FIG. 5.)

Reel body 110 is formed to include a slot (not shown) to slidably carry on/off selector assembly 140 in a conventional manner such that control slot 123 of on/off selector assembly 140 loosely engages distal end of coil spring engaging arm 118. When assembled, engaging arm 118 extends from coil spring 114 to engage control slot 123, as shown in FIG. 5. This configuration allows spring 114 to engage control slot 123, as shown in FIG. 5. This configuration causes engaging arm 118 to move when anti-reverse switch 120 is displaced between an OFF and ON position. With anti-reverse switch 120 in the OFF position, coil spring 114 loosely surrounds pinion extension 109 and rotor 106 and the related components of the drive train are free to turn in either direction. Because the anchoring arm 115 of coil spring 114 is held fixed in slot 125, displacement of engaging arm 118 from the OFF position to the ON position, causes coil spring 114 to wind more tightly around pinion extension 109, thereby increasing the frictional contact therebetween.

The anti-reverse effect achieved by this configuration is substantially the same as that described in the first preferred embodiment. The only substantial difference from the first embodiment is that the coil spring now tightens around the pinion or an extension thereof to prevent reverse rotation of the fishing reel. Specifically, moving anti-reverse switch 120 to the ON position tightens coil spring 114 around pinion extension 109. When pinion 107 rotates in the loosening direction of coil spring 114, the frictional contact between the rotating pinion extension 109 and coil spring 114 urges the coils of spring 114 to loosen, permitting pinion 107 and the related drive train components to turn with relative ease. When pinion extension 109 rotates in the tightening direction of coil spring 114, frictional contact between pinion extension 109 and coil spring 114 urges the coils of spring 114 to wind more tightly around pinion extension preventing pinion extension 109 of pinion 107 and the related drive train components from rotating relative to body 110 through anchoring arm 115.

DESCRIPTION OF A THIRD PREFERRED EMBODIMENT

FIGS. 6 and 7 show a third preferred embodiment of the present invention wherein the anti-reverse mechanism engages the main gear of a fishing reel.

The anti-reverse mechanism of the third preferred embodiment comprises a coil spring 214, on/off selector assembly 240, adapted main gear 231 having support surface 236, adapted reel body 210 slidably engaging on/off selector assembly 240, and strengthening plate 235 attached to reel body 210. (See FIG. 6.)

More particularly, main gear 231 is formed to include support surface 236. Friction coil spring 214 is configured to circumscribe support surface 236 of main gear 231 in close proximity to the outside diameter thereof. (See FIGS. 6 and 7.) Strengthening plate 235 is fixed in a conventional manner to a side plate of reel body 210 (not shown). Strengthening plate 235 has hole 234 extending therethrough as shown in FIGS. 6 and 7. A first end of coil spring 214 is formed to be anchoring arm 215. Anchoring arm 215 positions in hole 234 of strengthening plate 235 to hold coil spring 214 rotationally fixed relative to strengthening plate 235. The second end of coil spring 214 is formed to be coil spring engaging arm 218. (See FIG. 7.)

Reel body 210 is formed to further include a slot to slidably engage on/off selector assembly 240 in a conventional manner such that control slot 223 of on/off selector switch 220 engages engaging arm 218. (See FIG. 6.) When assembled, coil spring engaging arm 218 extends from coil spring 214 to engage control slot 223, as shown in FIG. 6. This configuration causes coil spring engaging arm 218 to move when anti-reverse switch 220 is displaced between an OFF and ON positions. With on/off selector switch 220 in the OFF position, coil spring 214 loosely surrounds support surface 236 of main gear 231 permitting main gear 231 and the related components of the drive train to turn in either direction. Because anchoring arm 215 is held fixed by engagement in hole 234, displacement of coil spring engaging arm 218 from the OFF position to the ON position, causes coil spring 214 to wind more tightly around support surface 236, thereby increasing the frictional contact therebetween.

The anti-reverse effect achieved by this third preferred embodiment performs in substantially the same manner as that described in the first preferred embodiment. Specifically, moving switch 220 to the ON position tightens coil spring 214 around support surface 236. When support surface 236 rotates in the loosening direction of coil spring 214, the frictional contact between the rotating support surface 236 and coil spring 214 urges the coils of spring 214 to loosen and main gear 231 and the related drive train components can turn with relative ease. When support surface 236 rotates in the tightening direction of coil spring 214, the frictional contact between support surface 236 and coil spring 214 urges the coils of spring 214 to wind more tightly around support surface 236 and prevent main gear 231 from rotating through anchoring arm 215.

Furthermore, FIG. 8 discloses a preferred form of a coiled spring that may be incorporated in the present invention. Specifically, coiled spring 314 has flat inner surfaces such that more frictional contact is achieved when the spring is tightened around the various drive train components of a fishing reel according to the teaching of the present invention.

Figure 10:
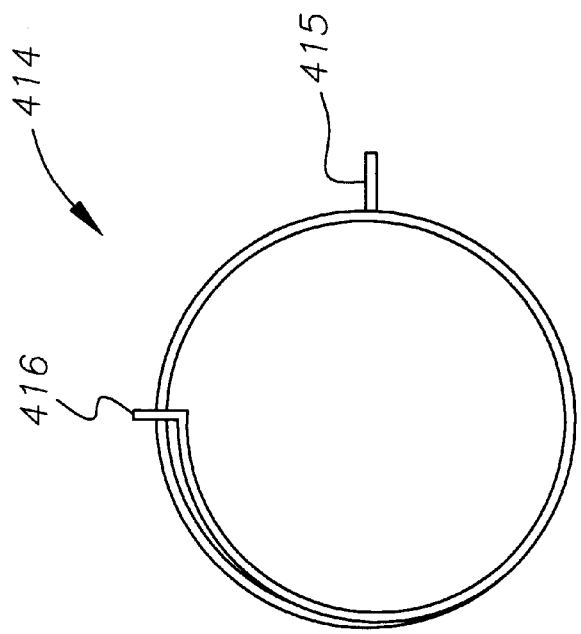
FIG. 10 is a front elevation view of the coil spring of FIG. 9.
Figure 9:
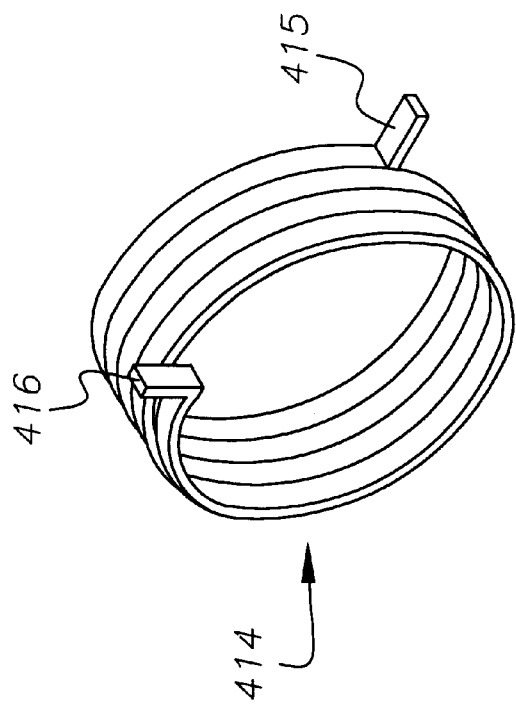
FIG. 9 is a perspective view of another preferred coil spring for use in the present invention.

Still further, FIGS. 9 and 10 disclose another preferred coil spring that may be incorporated into any of the above-described embodiments in the present invention. More particularly, FIGS. 9 and 10 illustrate a coil spring 414 having an anchoring arm 415 and an engaging end 416 with a reduced radius of curvature. As FIGS. 9 and 10 illustrate, coil spring 414 has a substantially flat inner surface, thereby enhancing the frictional contact between the coil spring and any circumscribed part. In one preferred embodiment, the portion of the coil spring having the reduction of radius curvature begins at any portion of the coil spring and ends at the beginning of engaging arm 416. This reduced-radius portion of the coil spring increases the frictional contact with the circumscribed drive train component (i.e. the pinion, rotor, or main gear) and thereby enhances the initiation of the grasping action of the coil spring.

SUMMARY

With respect to the above description then, the optimum dimensional relationships for the parts of the invention, to include variations in size, materials, shape, form, function and the manner of operation, assembly and use, are readily apparent and obvious to one skilled in the art. Accordingly, all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, the invention is not limited to the exact construction and operation shown and described. Therefore, all suitable modifications and equivalents which may be resorted to fall within the scope of the invention.

I claim:

1. A fishing reel having a coil spring anti-reverse mechanism, wherein said fishing reel comprises:
   a reel body,
      said reel body having anchoring means,
      said reel body having a drive train,
         said drive train including a pinion, a rotor attached to said pinion, and a main gear journalled into said reel body and operably engaging said pinion,
   a coil spring,
      said coil spring having a first anchoring end and a second engaging end,
      said coil spring fixed at said anchoring end to said anchoring means of said reel body,
      said coil spring closely circumscribing an element of said drive train,
      said coil spring engaging said circumscribed drive train element, such that when said circumscribed drive train element rotates in the loosening direction of said coil spring, the frictional contact between said rotating circumscribed drive train element and said coil spring urges the coils of said spring to loosen permitting said drive train element and the related drive components to rotate freely; and, such that when said circumscribed drive train element rotates in the tightening direction of said coil spring, the frictional contact between said circumscribed drive train element and said coil spring urges the coils of said spring to grasp said circumscribed drive train element and prevent said circumscribed drive train element and the related drive components of said drive train from rotating.

2. The fishing reel of claim 1 wherein said coil spring has a reduced radius of curvature proximal to said engaging end.

3. The fishing reel of claim 1 wherein said coil spring has a substantially flat inner surface, whereby said substantially flat inner surface enhances frictional contact between said coil spring and said circumscribed part.

4. The fishing reel of claim 1 wherein said reel body has a cutout section therethrough, and wherein said coil spring tensioning means is a sliding switch having a slot defined therein, wherein said slot slidably engages said cutout section of said reel body.

5. A fishing reel having a coil spring anti-reverse mechanism, wherein said fishing reel comprises;
    a reel body,
        said reel body having anchoring means,
        said reel body having a drive train,
            said drive train including a pinion, a rotor attached to said pinion, and a main gear journalled into said reel body and operably engaging said pinion,
    a coil spring,
        said coil spring having a first anchoring end and a second engaging end,
        said coil spring fixed at said anchoring end to said anchoring means of said reel body,
        said coil spring closely circumscribing an element of said drive train means,
    coil spring tension adjustment means,
        said coil spring tension adjustment means selectively positionable between a first position and a second position,
        said coil spring tension adjustment means engaging said engaging end of said coil spring such that when said coil spring tension adjustment means is in said first position said coil spring is in reduced frictional contact with said rotating circumscribed drive train element, permitting said drive train element and the related drive components to rotate freely in either direction, and such that when said coil spring tension adjustment means is in said second position said coil spring is placed into increased frictional contact with said circumscribed drive train element so that when said circumscribed drive train element rotates in the loosening direction of said coil spring, the frictional contact between said rotating circumscribed drive train element and said coil spring urges the coils of said spring to loosen, permitting said drive train element and the related drive components to rotate freely; and, such that when said circumscribed drive train element rotates in the tightening direction of said coil spring, the frictional contact between said circumscribed drive train element and said coil spring urges the coils of said spring to grasp said circumscribed drive train element and prevent said circumscribed drive train element and the related components of said drive train from rotating.

6. The fishing reel of claim 5 wherein said coil spring has a reduced radius of curvature proximal to said engaging end.

7. The fishing reel of claim 5 wherein said coil spring has a substantially flat inner surface, whereby said substantially flat inner surface provides enhanced frictional contact between said coil spring and said circumscribed part.

8. A fishing reel having a coil spring anti-reverse mechanism, wherein said fishing reel comprises:
    a reel body,
        said reel body having a support block having a slot on the outer surface thereof,
        said reel body having a drive train,
            said drive train including a pinion, a rotor attached to said pinion, and a main gear journalled into said reel body and operably engaging said pinion,
    a coil spring, said coil spring having a first anchoring end and a second engaging end, said coil spring fixed at said anchoring end in said slot on the outer surface of said support block, said coil spring closely circumscribing said pinion of said drive train, said coil spring engaging said circumscribed pinion, such that when said circumscribed pinion rotates in the loosening direction of said coil spring, the frictional contact between said rotating circumscribed pinion and said coil spring urges the coils of said spring to loosen permitting said pinion and the related drive components to rotate freely; and, such that when said circumscribed pinion rotates in the tightening direction of said coil spring, the frictional contact between said circumscribed pinion and said coil spring urges the coils of said spring to grasp said circumscribed pinion and prevent said circumscribed pinion and the related drive components of said drive train from rotating.

9. The fishing reel of claim 8 wherein said coil spring has a reduced radius of curvature proximal to said engaging end.

10. The fishing reel of claim 8 wherein said coil spring has a substantially flat inner surface, whereby said substantially flat inner surface provides enhanced frictional contact between said coil spring and said circumscribed part.

11. A fishing reel having a coil spring anti-reverse mechanism, wherein said fishing reel comprises;
    a reel body,
        said reel body having a support block having a slot on the outer surface thereof,
        said reel body having a drive train,
            said drive train including a pinion, a rotor attached to said pinion, and a main gear journalled into said reel body and operably engaging said pinion,
    a coil spring,
        said coil spring having a first anchoring end and a second engaging end,
        said coil spring fixed at said anchoring end in said slot on the outer surface of said support block,
        said coil spring closely circumscribing said pinion of said drive train,
    a coil spring tension adjustment means,
        said coil spring tensioning adjustment means selectively positionable between a first position and a second position.
        said coil spring tension adjustment means engaging said engaging end of said coil spring such that when said coil spring tension adjustment means is in said first position said coil spring is in reduced frictional contact with said rotating circumscribed pinion, permitting said drive train element and the related drive components to rotate freely in either direction, and when said coil spring tension adjustment means is in said second position said coil spring is placed into increased frictional contact with said circumscribed pinion so that when said circumscribed pinion rotates in the loosening direction of said coil spring, the frictional contact between said rotating circumscribed pinion and said coil spring urges the coils of said spring to loosen, permitting said circumscribed pinion and the related drive components to rotate freely; and, such that when said circumscribed pinion rotates in the tightening direction of said coil spring, the frictional contact between said circumscribed pinion and said coil spring urges the coils of said spring to grasp said circumscribed pinion and prevent said circumscribed pinion and the related components of said drive train from rotating.

12. The fishing reel of claim 11 wherein said reel body has a cutout section therethrough, and wherein said coil spring tension adjustment means is a sliding switch having a slot defined therein, wherein said slot slidably engages said cutout section of said reel body.

13. The fishing reel of claim 11 wherein said coil spring has a reduced radius of curvature proximal to said engaging end.

14. The fishing reel of claim 11 wherein said coil spring has a substantially flat inner surface, whereby said substantially flat inner surface provides enhanced frictional contact between said coil spring and said circumscribed part.

15. A fishing reel having a coil spring anti-reverse mechanism, wherein said fishing reel comprises;
   a rotor,
      said rotor having a first annular member,
   a reel body,
      said reel body having a second annular member extending therefrom with a slot defined therein,
      said reel body having a drive train,
         said drive train including a pinion, said rotor attached to said pinion, and a main gear journalled into said reel body and operably engaging said pinion,
   a coil spring,
      said coil spring having a first anchoring end and a second engaging end,
      said coil spring fixed at said anchoring end in said slot of said second annular member of said reel body,
      said coil spring closely circumscribing said first annular member of said rotor of said drive train,
      said coil spring engaging said circumscribed first annular member, such that when said circumscribed first annular member rotates in the loosening direction of said coil spring, tie frictional contact between said rotating circumscribed first annular member and said coil spring urges the coils of said spring to loosen permitting said first annular member of said rotor and the related drive components to rotate freely; and, such that when said circumscribed first annular member rotates in the tightening direction of said coil spring, the frictional contact between said circumscribed first annular member and said coil spring urges the coils of said spring to grasp said circumscribed first annular member and prevent said circumscribed first annular member of said rotor and the related drive components of said drive train from rotating.

16. The fishing reel of claim 15 wherein said coil spring has a reduced radius of curvature proximal to said engaging end.

17. The fishing reel of claim 15 wherein said coil spring has a substantially flat inner surface, whereby said substantially flat inner surface provides enhanced frictional contact between said coil spring and said circumscribed part.

18. A fishing reel having a coil spring anti-reverse mechanism, wherein said fishing reel comprises:
   a rotor,
      said rotor having a first annular member,
   a reel body,
      said reel body having a second annular member extending therefrom with a slot defined therein,
      said reel body having a hole therethrough,
      said reel body having drive train means,
         said drive train means including a pinion, said rotor attached to said pinion, and a main gear journalled into said reel body and operably engaging said pinion,
   an on/off selector assembly,
      said on/off selector assembly comprising an anti-reverse switch, a support shaft coupled to said anti-reverse switch, and a switch cam coupled to said support shaft opposite said anti-reverse switch, wherein said switch cam has a slot therein, wherein said support shaft journals into said reel body such that said switch cam is positioned proximal to said hole in said reel body, said on/off selector assembly selectively positionable between a first position and a second position,
   a coil spring,
      said coil spring having a first anchoring end and a second engaging end,
      said coil spring fixed are said anchoring end in said slot of said second annular member of said reel body,
      said engaging end of said coil spring extending through said hole of
      said reel body into engagement with said slot of said switch cam,
      said coil spring closely circumscribing said first annular ring of said rotor of said drive train,
      wherein, when on/off selector assembly is in said first position said coil spring is in reduced frictional contact with said rotating circumscribed first annular member of said rotor, permitting said first annular member of said rotor and the related drive components to rotate freely in either direction, and when said on/off selector assembly is in said second position said coil spring is placed into increased frictional contact with said is circumscribed first annular member so that when said circumscribed first annular member rotates in the loosening direction of said coil spring, the frictional contact between said rotating circumscribed first annular member and said coil spring urges the coils of said spring to loosen, permitting said first annular member of said rotor and the related drive components to rotate freely; and, such that when said circumscribed first annular member rotates in the tightening direction of said coil spring, the frictional contact between said circumscribed first annular member and said coil spring urges the coils of said spring to grasp said circumscribed first annular member and prevent said circumscribed first annular member of said rotor and the related components of said drive train from rotating.

19. The fishing reel of claim 18 wherein said coil spring has a reduced radius of curvature proximal to said engaging end.

20. The fishing reel of claim 18 wherein said coil spring has a substantially flat inner surface, whereby said substantially flat inner surface provides enhanced frictional contact between said coil spring and said circumscribed part.

21. A fishing reel having a coil spring anti-reverse mechanism, wherein said fishing reel comprises:
   a reel body,
      said reel body having anchoring means integral therewith, said reel body having a drive train,
said drive train including a pinion journalled into said reel body, a rotor attached to said pinion, and a main gear journalled into said reel body and operably engaging said pinion, a coil spring,
said coil spring having a first anchoring end and a second engaging end,
said coil spring fixed at said anchoring end to said anchoring means of said reel body,
said coil spring closely circumscribing said main gear,
said coil spring engaging said circumscribed main gear, such that when said circumscribed main gear rotates in the loosening direction of said coil spring, the frictional contact between said rotating circumscribed main gear and said coil spring urges the coils of said spring to loosen permitting said main gear and the related drive components to rotate freely; and, such that when said circumscribed main gear rotates in the tightening direction of said coil spring, the frictional contact between said circumscribed main gear and said coil spring urges the coils of said spring to grasp said circumscribed main gear and prevent said circumscribed main gear and the related drive components of said drive train from rotating.

22. The fishing reel of claim 21 wherein said anchoring means of said reel body comprises a plate having a hole thererhrough attached to a lateral portion of said reel body, wherein said first anchoring end of said coil spring extends into said hole of said plate.

23. The fishing reel of claim 21 wherein said main gear includes a cylindrical support surface in the area circumscribed by said coil spring.

24. The fishing reel of claim 21 wherein said coil spring has a reduced radius of curvature proximal to said engaging end.

25. The fishing reel of claim 21 wherein said coil spring has a substantially flat inner surface, whereby said substantially flat inner surface provides enhanced frictional contact between said coil spring and said circumscribed part.

26. A fishing reel having a coil spring anti-reverse mechanism, wherein said fishing reel comprises:

a reel body,
said reel body having anchoring means integral therewith,
said reel body having a drive train,
said drive train including a pinion journalled into said reel body, a rotor attached to said pinion, and a main gear journalled into said reel body and operably engaging said pinion,
said reel body having a plate with a hole therethrough attached to a lateral portion of said reel body, a coil spring,
said coil spring having a first anchoring end and a second engaging end,
said coil spring fixed at said anchoring end to said anchoring means of said reel body,
said coil spring closely circumscribing said main gear, coil spring tension adjustment means,
said coil spring tensioning adjustment means selectively positionable between a first position and a second position,
said coil spring tension adjustment means engaging said engaging end of said coil spring such that when said coil spring tension adjustment means is in said first position said coil spring is in reduced frictional contact with said rotating circumscribed main gear, permitting said main gear and the related drive components to rotate freely in either direction, and
when said coil spring tension adjustment means is in said second position said coil spring is placed into increased frictional contact with said circumscribed main gear so that when said circumscribed main gear rotates in the loosening direction of said coil spring, the frictional contact between said rotating circumscribed main gear and said coil spring urges the coils of said spring to loosen, permitting said main gear and the related drive components to rotate freely; and, such that when said circumscribed main gear rotates in the tightening direction of said coil spring, the frictional contact between said circumscribed main gear and said coil spring urges the coils of said spring to grasp said circumscribed main gear and prevent said circumscribed main gear and the related components of said drive train from rotating.

27. The fishing reel of claim 26 wherein said coil spring has a reduced radius of curvature proximal to said engaging end.

28. The fishing reel of claim 26 wherein said coil spring has a substantially flat inner surface, whereby said substantially flat inner surface provides enhanced frictional contact between said coil spring and said circumscribed part.

* * * * *

UNITED STATES PATENT AND TRADEMARK OFFICE
CERTIFICATE OF CORRECTION

PATENT NO. : 5,950,948
DATED : September 14, 1999
INVENTOR(S) : John Newton Young It is certified that error appears in the above-indentified patent and that said Letters Patent is hereby corrected as shown below:

At Column 10, line 23, "said coil spring fixed are said anchoring end" should read –said coil spring fixed at said anchoring end–.

Signed and Sealed this

Sixth Day of June, 2000

*Attest:*

*Attesting Officer*

Q. TODD DICKINSON
*Director of Patents and Trademarks*